United States Patent
Shimazaki

(10) Patent No.: US 7,706,943 B2
(45) Date of Patent: Apr. 27, 2010

(54) TURNING RADIUS CALCULATION, STEERING ASSISTANCE AND PARKING ASSISTANCE EMPLOYING TURNING RADIUS FUNCTION

(75) Inventor: Kazunori Shimazaki, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 1172 days.

(21) Appl. No.: 10/558,051

(22) PCT Filed: Mar. 23, 2005

(86) PCT No.: PCT/JP2005/006003

§ 371 (c)(1),
(2), (4) Date: Nov. 22, 2005

(87) PCT Pub. No.: WO2005/102822

PCT Pub. Date: Nov. 3, 2005

(65) Prior Publication Data

US 2006/0247834 A1     Nov. 2, 2006

(30) Foreign Application Priority Data

Apr. 26, 2004   (JP) ............................. 2004-130056

(51) Int. Cl.
 *B63G 8/20* (2006.01)
 *B60Q 1/48* (2006.01)
 *G08G 1/14* (2006.01)

(52) U.S. Cl. .................... 701/41; 701/36; 340/932.2

(58) Field of Classification Search .............. 701/36, 701/41, 44; 340/932.2
See application file for complete search history.

(56) References Cited

U.S. PATENT DOCUMENTS 4,162,859 A   *   7/1979   McAfee ...................... 403/75

(Continued)

FOREIGN PATENT DOCUMENTS

DE         196 18 624        9/1997

(Continued)

OTHER PUBLICATIONS

Eland, Peter."Spreadsheets for Ackermann steering linkage design." Mar. 12, 2002. Available at http://web.archive.org/web/20031205034541/www.eland.org.uk/steering.html http://web.archive.org/web/20031220221349/www.eland.org.uk/steer_sheets.html http://web.archive.org/web/20031012051604/http://www.eland.org.uk/pages/steeringformats/steering.xls.*

(Continued)

Primary Examiner—Thomas G Black
Assistant Examiner—Sze-Hon Kong
(74) Attorney, Agent, or Firm—Locke Lord Bissell & Liddell LLP

(57) ABSTRACT

Disclosed is a turning radius calculation method including: expressing a steering system model by means of relational expressions having a steering angle and turning angles of outer and inner tires as variables and including known parameters and unknown parameters; entering data on the known parameters based on design data; calculating the unknown parameters from the relational expressions corresponding to a zero-steering state and the relational expressions corresponding to a full-steering state; calculating turning angles of outer and inner tires respectively corresponding to a plurality of steering angles between the zero-steering state and the full-steering state using the relational expressions where calculated data on the unknown parameters are entered; calculating turning radii corresponding to the calculated turning angles of the outer and inner tires; and calculating an approximate function of turning radius for steering angle based on the plurality of steering angles and the turning radii.

14 Claims, 5 Drawing Sheets

U.S. PATENT DOCUMENTS

| | | | | |
|---|---|---|---|---|
| 4,263,979 A * | 4/1981 | Sturgill | ............ | 180/411 |
| 4,353,568 A * | 10/1982 | Boyce | ............ | 280/89.11 |
| 4,600,205 A * | 7/1986 | Stewart et al. | ............ | 280/86.758 |
| 4,792,007 A * | 12/1988 | Abe et al. | ............ | 180/414 |
| 4,875,697 A * | 10/1989 | Miller | ............ | 280/86.758 |
| 5,143,400 A * | 9/1992 | Miller et al. | ............ | 280/5.522 |
| 5,469,928 A * | 11/1995 | Adler et al. | ............ | 180/6.28 |
| 5,484,227 A * | 1/1996 | Ikeda et al. | ............ | 404/84.1 |
| 6,079,510 A * | 6/2000 | Miyamoto | ............ | 180/8.3 |
| 6,272,409 B1 * | 8/2001 | Elwood | ............ | 701/41 |
| 6,283,483 B1 * | 9/2001 | Johnson et al. | ............ | 280/86.758 |
| 6,540,243 B2 * | 4/2003 | Takayanagi et al. | ............ | 280/93.51 |
| 6,827,176 B2 * | 12/2004 | Bean et al. | ............ | 180/411 |
| 6,951,259 B2 * | 10/2005 | Irikura | ............ | 180/6.3 |
| 7,295,227 B1 * | 11/2007 | Asahi et al. | ............ | 348/118 |
| 2002/0041239 A1 * | 4/2002 | Shimizu et al. | ............ | 340/932.2 |
| 2003/0009266 A1 * | 1/2003 | Yamada et al. | ............ | 701/1 |
| 2004/0046350 A1 * | 3/2004 | Wagner et al. | ............ | 280/124.135 |
| 2004/0153243 A1 * | 8/2004 | Shimazaki et al. | ............ | 701/300 |

FOREIGN PATENT DOCUMENTS

| | | |
|---|---|---|
| EP | 1 022 903 | 7/2000 |
| EP | 1022903 A2 * | 7/2000 |
| EP | 1 322 948 | 8/2003 |
| JP | 2001-180405 A | 7/2001 |
| JP | 2001-187552 | 7/2001 |
| JP | 2001-285681 | 10/2001 |
| JP | 2001-334951 A | 12/2001 |
| JP | 2002-251632 | 9/2002 |
| JP | 2003-205717 A | 7/2003 |

OTHER PUBLICATIONS

Japanese Office Action mailed on Jun. 23, 2009 for Japanese Patent Application No. 2004-130056 (No English translation provided).

* cited by examiner

TURNING RADIUS CALCULATION, STEERING ASSISTANCE AND PARKING ASSISTANCE EMPLOYING TURNING RADIUS FUNCTION

TECHNICAL FIELD TO WHICH THE INVENTION BELONGS

This invention relates to a method of calculating a turning radius of a vehicle from a steering angle, a steering assistance apparatus and a parking assistance apparatus employing this method, a turning radius calculation program causing a computer to execute this method, and a recording medium.

PRIOR ART

Conventionally, as disclosed in, for example, JP 2002-251632 A, there has been developed a driving assistance apparatus that assists a driving operation by displaying on a monitor screen an actual rear view image of a vehicle captured by a CCD camera and displaying on the monitor screen in a superimposed manner a predicted locus of the vehicle during its backward movement according to, for example, information on a steering angle detected by a sensor. The driving assistance apparatus as described above allows a driver to perform, for example, lateral parking of a vehicle in a parking space by driving the vehicle while viewing the predicted locus on the monitor screen.

PROBLEMS TO BE SOLVED BY THE INVENTION

To draw a predicted locus during backward movement of the vehicle in this manner, a vehicle turning radius corresponding to an arbitrary steering angle is required. Conventionally, after the vehicle has made turns by a plurality of different steering angles, respective turning radii of the vehicle are actually measured and data thus obtained are interpolated or processed otherwise to obtain a turning radius of the vehicle.

However, actual measurement of a turning radius needs to be carried out a plurality of times corresponding to a plurality of different steering angles. This causes a problem of extreme troublesomeness. Furthermore, if an attempt is made to install the driving assistance apparatus in several vehicle models, it is required to find vehicle characteristics of each vehicle model through actual measurement, which is a laborious operation.

This invention has been made in consideration of the conventional problems described above. It is an object of this invention to provide a turning radius calculation method capable of easily obtaining a vehicle turning radius corresponding to an arbitrary steering angle without carrying out actual measurement.

Further, it is another object of this invention to provide a steering assistance apparatus and a driving assistance apparatus employing such a turning radius calculation method.

Furthermore, it is still another object of this invention to provide a turning radius calculation program causing a computer to execute the turning radius calculation method, and a recording medium.

MEANS FOR SOLVING THE PROBLEMS

A turning radius calculation method according to a first aspect of this invention includes the steps of: expressing a steering system model by means of relational expressions having a steering angle and turning angles of outer and inner tires as variables and including known parameters and unknown parameters; making a request to enter data on the known parameters based on design data; calculating the unknown parameters from the relational expressions corresponding to a zero-steering state and the relational expressions corresponding to a full-steering state after the entry of the data on the known parameters; calculating turning angles of outer and inner tires respectively corresponding to a plurality of steering angles obtained by dividing a range between the zero-steering state and the full-steering state using the relational expressions where calculated data on the unknown parameters are entered; calculating turning radii corresponding to the calculated turning angles of the outer and inner tires; and calculating an approximate function of turning radius for steering angle based on the plurality of steering angles and the turning radii.

By entering data on the known parameters based on the design data of the vehicle, the unknown parameters are calculated from the relational expressions corresponding to the zero-steering state and the relational expressions corresponding to the full-steering state. The turning angles of the outer and inner tires corresponding to the plurality of steering angles are respectively calculated using the relational expressions. The turning radii are respectively calculated from the turning angles of the outer and inner tires, and the approximate function of turning radius for steering angle is obtained.

A steering assistance apparatus according to a second aspect of this invention relates to a steering assistance apparatus that displays on a monitor in a superimposed manner a vehicle rear view image during backward movement of a vehicle and a backward movement locus of the vehicle corresponding to a steering angle, in which the backward movement locus of the vehicle is displayed on the monitor based on a turning radius calculated from a steering angle by the turning radius calculation method described above.

Further, a parking assistance apparatus according to a third aspect of this invention relates to a parking assistance apparatus that provides guidance on an operation of parking a vehicle into a target parking space, in which guidance on the operation of parking the vehicle is provided based on a turning radius calculated from a steering angle by the turning radius calculation method described above.

A turning radius calculation program according to a fourth aspect of this invention causes a computer to execute the steps of expressing a steering system model by means of relational expressions having a steering angle and turning angles of outer and inner tires as variables and including known parameters and unknown parameters; entering data on the known parameters based on design data on a vehicle; calculating the unknown parameters from the relational expressions corresponding to a zero-steering state and the relational expressions corresponding to a full-steering state after the entry of the data on the known parameter; calculating turning angles of outer and inner tires respectively corresponding to a plurality of steering angles between the zero-steering state and the full-steering state using the relational expression where calculated data on the unknown parameters are entered; calculating turning radii corresponding to the calculated turning angles of the outer and inner tires; and calculating an approximate function of turning radius for steering angle based on the plurality of steering angles and the turning radii.

Further, a recording medium according to a fifth aspect of this invention relates to a computer-readable recording medium in which the turning radius calculation program described above is recorded.

EMBODIMENT MODE FOR CARRYING OUT THE INVENTION

An embodiment of this invention will be described hereinafter based on the accompanying drawings.

Figure 1:
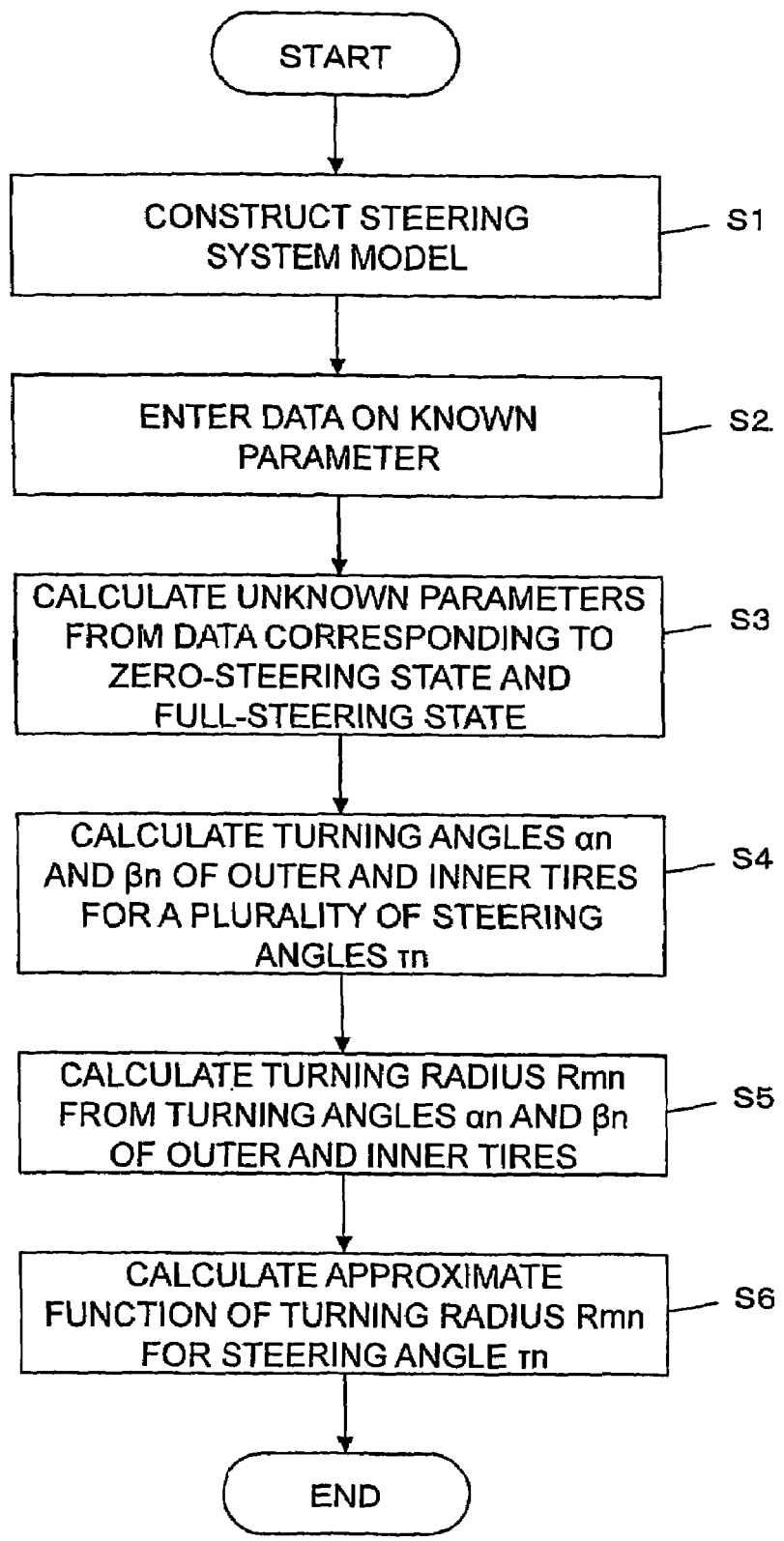
FIG. 1 is a flowchart showing a turning radius calculation method according to an embodiment of this invention.

FIG. 1 shows a flowchart of a turning radius calculation method according to the embodiment. First of all in step S1, a steering system model is structured using predetermined pieces of vehicle design data. This embodiment handles a steering system model as illustrated in FIG. 2.

Figure 2:
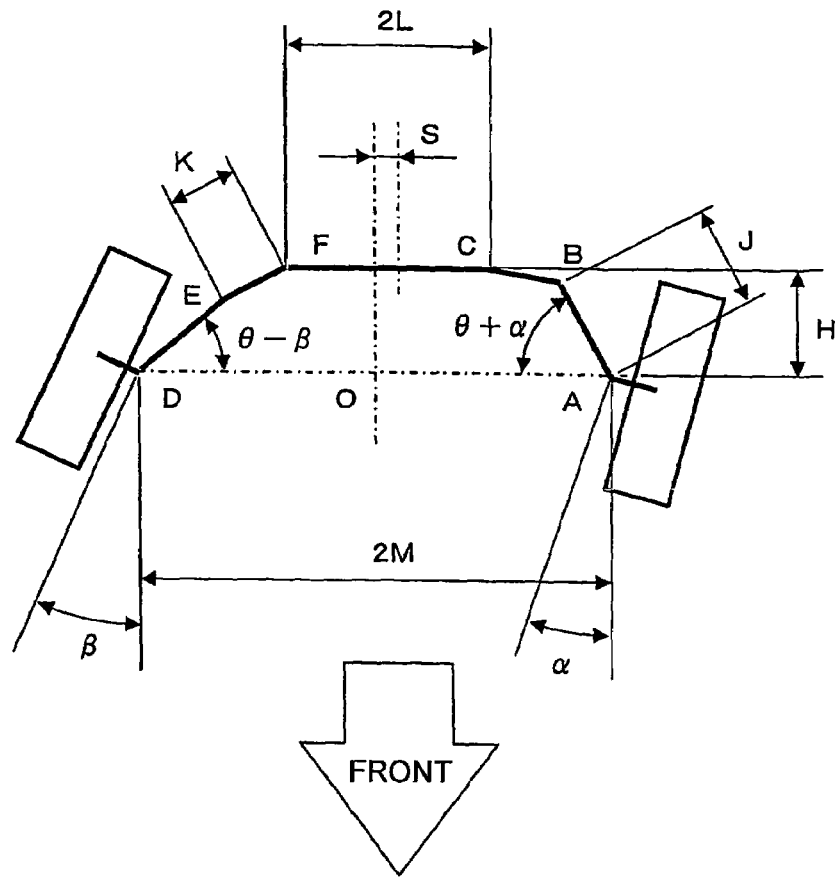
FIG. 2 is a view showing a steering system model used in the embodiment.

Referring to FIG. 2, AB denotes a rocker arm turning around a point A (kingpin) together with a tire, DE denotes a rocker arm turning around a point D (kingpin) together with a tire, CF denotes a rack moving laterally according to the steering of a steering wheel, BC denotes a tie rod connected to the rocker arm and the rack, EF denotes a tie rod connected to the rocker arm and the rack, H denotes a position of the rack, J denotes a length of the rocker arm, K denotes a length of the tie rod, 2L denotes a length of the rack, 2M denotes a distance between the kingpins, S denotes a rack stroke (which is proportional to a steering angle τ of the steering wheel), θ denotes an angle of the rocker arm, α denotes a turning angle of an outer tire, and β denotes a turning angle of an inner tire.

It is apparent herein from FIG. 2 that the square of the distance between B and C is equal to the square of the length K of the tie rod, and that the square of the distance between E and F is equal to the square of the length K of the tie rod. Therefore, the following relational expressions (1) and (2) are obtained.

$$[\{M-J\cos(\theta+\alpha)\}-(L+S)]^2+[J\sin(\theta+\alpha)-H]^2=K^2 \quad (1)$$

$$[\{-M+J\cos(\theta-\beta)\}-(-L+S)]^2+[J\sin(\theta-\beta)-H]^2=K^2 \quad (2)$$

Then in step S2, an operator is required to enter, on the basis of design data, pieces of data on known parameters including the length K of the tie rod, the length 2L of the rack, the distance 2M between the kingpins, a maximum stroke Sm of the rack, a maximum turning angle αm of the outer tire, and a maximum turning angle βm of the inner tire.

It is not absolutely necessary that the operator be requested to enter the pieces of data on the known parameters. Data prepared in advance may also be read automatically or through an operation performed by the operator.

When the pieces of data on the known parameters are entered in step S2, the following expressions are obtained from a zero-steering (neutral position) state and a full-steering state in step S3.

First of all, when the amount of steering is zero, α=β=0 and S=0. Thus, the following expression (3) is obtained from the expressions (1) and (2).

$$[\{M-J\cos(\theta)\}-L]^2+[J\sin(\theta)-H]^2=K^2 \quad (3)$$

Further, when the amount of steering is at its maximum, α=αm, β=βm, and S=Sm. Therefore, the expressions (1) and (2) are expressed as the following expressions (4) and (5), respectively.

$$[\{M-J\cos(\theta+\alpha m)\}-(L+Sm)]^2+[J\sin(\theta+\alpha m)-H]^2=K^2 \quad (4)$$

$$[\{-M+J\cos(\theta-\beta m)\}-(-L+Sm)]^2+[J\sin(\theta-\beta m)-H]^2=K^2 \quad (5)$$

Now, using a numerical analysis method such as a Newton-Raphson method, the expressions (3), (4), and (5) are solved as to the unknown parameters J, H, and θ. If the obtained solutions of the unknown parameters J, H, and θ are assigned to the expressions (1) and (2), these expressions (1) and (2) include the turning angle α of the outer tire, the turning angle β of the inner tire, and the stroke S of the rack as variables.

Thus, in step S4, a value Sn (n=0 to 10, S0=0, S10=Sm) obtained by dividing a range of, for example, S=0 to S=Sm into ten equal parts is given for the stroke S of the rack, and the expressions (1) and (2) are solved as to α and β by means of a numerical analysis method such as a Newton-Raphson method. In this manner, it is possible to obtain αn and βn corresponding to Sn.

Because the stroke S of the rack is proportional to the steering angle τ of the steering wheel and a full steering angle τm is known as design data of the vehicle, it is possible to calculate τn corresponding to Sn. As a result, a plurality of pairs of the turning angle αn of the outer tire and the turning angle βn of the inner tire are obtained for a predetermined steering angle τn of the steering wheel. The steering angle τ of the steering wheel is defined only as a positive value representing a degree of steering on one side.

Figure 3:
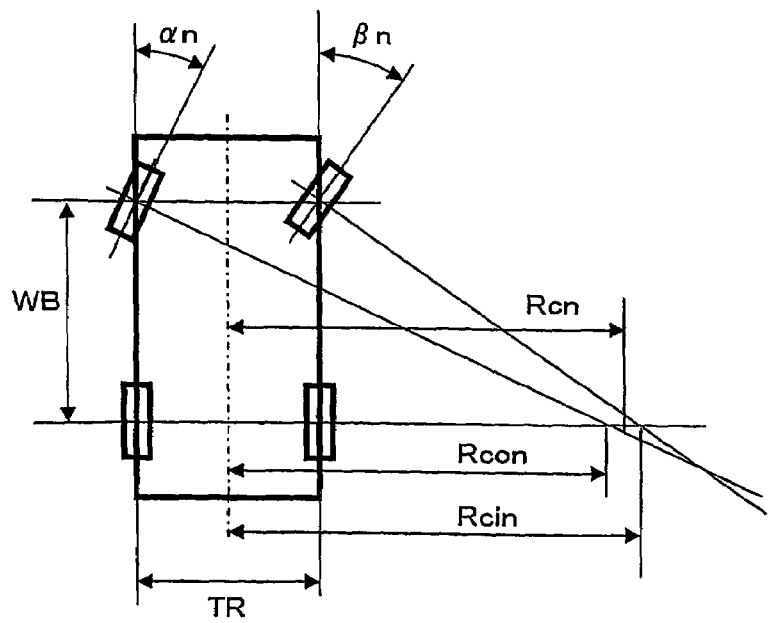
FIG. 3 is a view conceptually showing a method of calculating a turning radius of a vehicle from turning angles of outer and inner tires.

Then in step S5, a turning radius of the center of a rear axle of a vehicle is calculated from the turning angle αn of the outer tire and the turning angle βn of the inner tire. If an intersection point of extensions of axes of right and left front wheels (steered vehicle wheels) is located on an extension of an axis of rear wheels (i.e., in the case of Ackermann geometry), a turning radius can be calculated relatively simply. In general, however, the intersection point of the extensions of the axes of the front-right and front-left wheels is not located on the extension of the axis of the rear wheels as shown in FIG. 3. In this embodiment, therefore, a turning radius is calculated assuming that the midpoint between the intersection point of the axis of the right front wheel and the axis of the rear wheels and the intersection point of the axis of the left front wheel and the axis of the rear wheels represents a turning center.

Referring to FIG. 3, a distance Rcin from the center of the rear axle to the intersection point of the axis of the inner tire and the axis of the rear wheels is expressed as follows.

$$Rcin=WB/\tan(\beta n)+M \quad (6)$$

A distance Rcon from the center of the rear axle to the intersection point of the axis of the outer tire and the axis of the rear wheel is expressed as follows.

$$Rcon=WB/\tan(\alpha n)-M \quad (7)$$

Accordingly, a turning radius Rcn is expressed as follows.

$$Rcn = (Rcin + Rcon)/2 \qquad (8)$$
$$= Wb[\{1/\tan(\alpha n)\} + \{1/\tan(\beta n)\}]/2$$

It should be noted herein that WB denotes a wheel base of the vehicle and that M denotes half of the distance between the kingpins.

Thus, the turning radius Rcn corresponding to the predetermined turning angle αn of the outer tire and the predetermined turning angle βn of the inner tire is calculated.

As described in step S4, the turning angle αn of the outer tire and the turning angle βn of the inner tire have been obtained for the predetermined steering angle τn, which means that the turning radius Rcn corresponding to the predetermined steering angle τn has been thus calculated.

Moreover, a turning radius Rm is obtained from Rcn by performing the following calculation.

$$Rmn = \{(Rcn+M)^2 + WB^2\}^{1/2} + IK$$

It should be noted herein that Rmn denotes a turning radius of the outer front wheel (i.e., the steered vehicle wheel located on the outside of a turn), and that IK denotes a distance between the center of the tire of the front wheel and the kingpin and is expressed as follows.

$$IK = (TRF - 2M)/2$$

It should be noted herein that TRF denotes a front tread.

Based on the plurality of pairs of the steering angle τn and the turning radius Rmn calculated in step S5, an approximate function R(τ) of the turning radius Rmn for the steering angle τn is calculated in step S6.

For instance, the approximate function R(τ) is approximated by a power function and defined as the following expression (9) including unknown coefficients A and B.

$$R(\tau) = A \cdot (\tau)^B \qquad (9)$$

The following expression (10) can be produced for this approximate function R(τ) from the plurality of pieces of data obtained in step S5 as to the steering angle τn and the turning radius Rmn.

$$Rmn = A \cdot (\tau n)^B + Dn \text{ (e.g., n=0 to 10)} \qquad (10)$$

Then, the coefficients A and B minimizing a sum V of squares of a difference Dn, that is, $V = \Sigma(Dn)^2$ are calculated. For example, a numerical analysis method such as a simplex method can be used as a method of calculation.

By applying the calculated coefficients A and B to the expression (9), a function expression R(τ) for obtaining a turning radius for an arbitrary steering angle is obtained.

Figure 4:
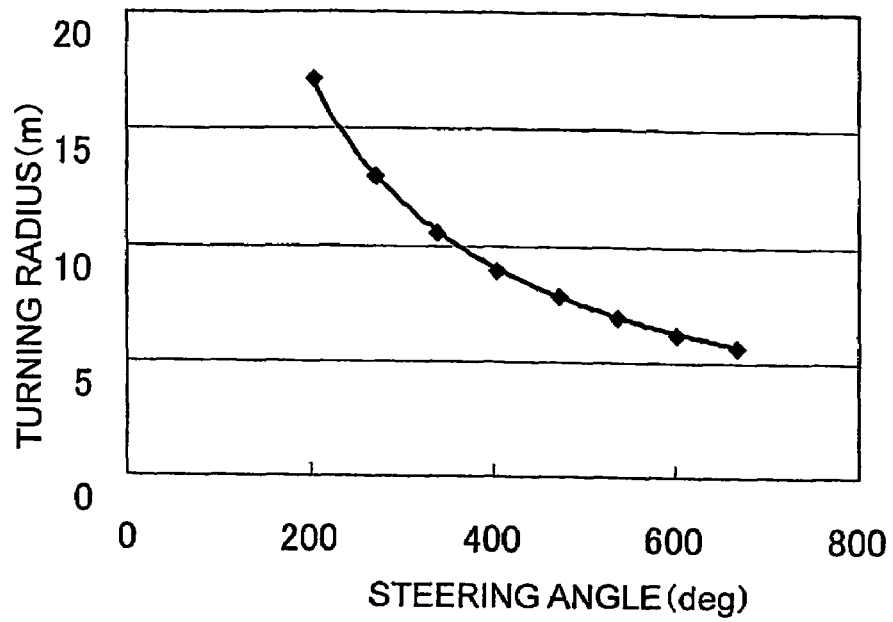
FIG. 4 is a graph showing a function expression of a turning radius for a steering angle obtained in the embodiment.

A relation of the turning radius to the steering angle is obtained from the function expression R(τ) thus obtained, for example, as shown in FIG. 4.

In calculating the approximate function R(τ) in step S6, instead of using all of, for example, 10 pairs of the steering angle τn and the turning radius Rmn, a suitable number of pairs of data may be selected for use from the greater steering side (which is close to a full-steering state), whereby a function approximated with greater precision can be obtained on the greater steering side. Thus, it is possible to provide more accurate loci of backward movements of the vehicle and more accurate parking guidance in assisting steering or parking.

The approximate function R(τ) may also be calculated with the data on, for example, 10 pairs of the steering angle τn and the turning radius Rmn weighed heavier as the amount of steering increases.

Figure 5:
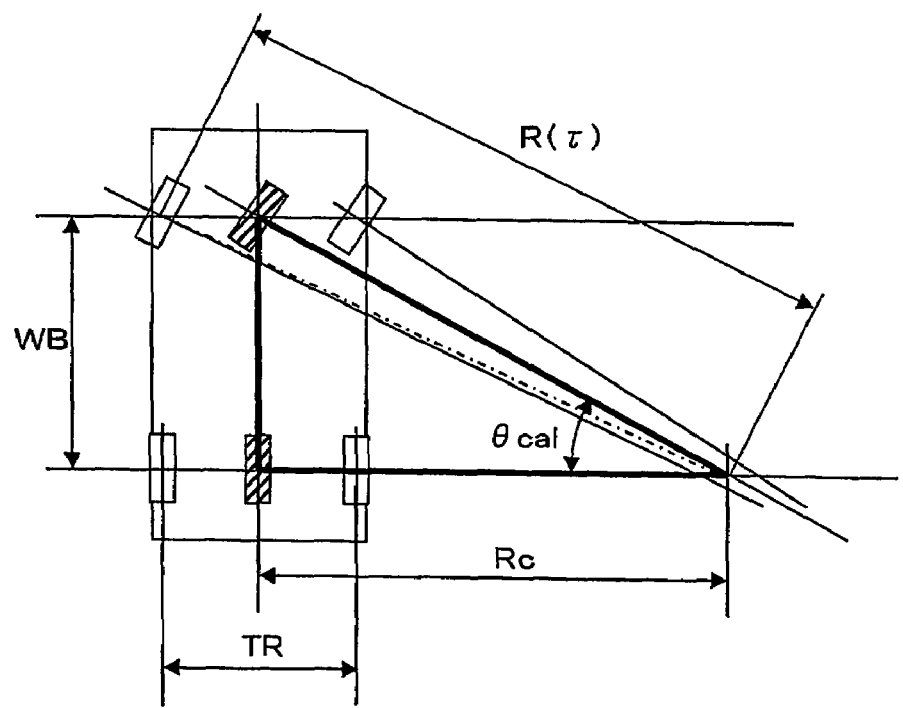
FIG. 5 is a view conceptually showing another method of calculating a turning radius of the vehicle from turning angles of the outer and inner tires.

Further, the approximate function R(τ) may also be approximated by a function other than the power function. As shown in FIG. 5, assuming that a two-wheel model is used and θcal denotes a virtual turning angle of the front wheel, for example, the following expression (11) is obtained.

$$R(\tau) = [WB^2 + (Rc+M)^2]^{1/2} + IK \qquad (11)$$

In the above expression, Rc=WB/tan(θcal) and θcal=Cτ²+Dτ+E. Coefficients C, D, and E minimizing the sum of the square of a difference between the turning radius Rmn and a value obtained from the expression (11) by selecting a suitable number of pairs of data from the greater steering side (which is close to the full-steering state) are calculated.

By applying the calculated coefficients C, D, and E to the expression (11), the function expression R(τ) for obtaining a turning radius for an arbitrary steering angle is obtained.

Although J, H, and θ are used as the unknown parameters in the embodiment, this should not be construed respectively. For instance, it is also possible to use H as the known parameter instead of K and find solutions as to the unknown parameters J, K, and θ. Other combinations are possible as well. It suffices that solutions be found as to unknown parameters by actually using a known parameter.

The coefficients of the approximate function R(τ) are calculated by obtaining the turning radius Rcn for the plurality of steering angles τn in the embodiment. On the contrary, however, it is also possible to calculate the coefficients of the approximate function R(τ) by calculating the steering angle τn for a plurality of turning radii Rcn.

As a method of calculating a turning radius from the turning angle αn of the outer tire and the turning angle βn of the inner tire, a calculation method of balancing slipping forces of the front wheels can also be used instead of performing calculation assuming that the midpoint between the intersection point of the axis of the right front wheel and the axis of the rear wheels and the intersection point of the axis of the left front wheel and the axis of the rear wheels represents a turning center.

If it is assumed that Δαn denotes an angular difference between an actual traveling direction of the outer tire and an actual angle of the outer tire and that Δβn denotes an angular difference between an actual traveling direction of the inner tire and an actual angle of the inner tire, cornering forces Fo and Fi are applied to the outer and inner tires in directions perpendicular to them, respectively. A cornering force can be approximated as a value proportional to an angular difference and a speed. Further, the speeds of the right and left wheels are proportional to the turning radii of the right and left wheels, respectively. In other words, the cornering force Fo or Fi is proportional to the angular difference and turning radius of each of the tires.

Accordingly, the following expressions are obtained.

$$Fi \propto WBi \cdot \Delta\beta n / \sin(\beta n + \Delta\beta n)$$

$$Fo \propto WBo \cdot \Delta\alpha n / \sin(\alpha n - \Delta\alpha n)$$

It should be noted herein that WBi denotes a distance between the front and rear wheels on the inside and that WBo denotes a distance between the front and rear wheels on the outside.

Since no deviation from a turning circle is observed, regarding the cornering forces applied to the right and left front wheels, their respective components in the radial direction of the turning circle are balanced with each other.

Therefore, the following expression is obtained.

$$Fi \cdot \cos(\Delta\beta n) = Fo \cdot \cos(\Delta\alpha n)$$

Thus, the following expression (12) is obtained.

$$WBi \cdot \Delta\beta n \cdot \cos(\Delta\beta n)/\sin(\beta n + \Delta\beta n) = WBo \cdot \Delta\alpha n \cdot \cos(\Delta\alpha n)/\sin(\alpha n - \Delta\alpha n) \quad (12)$$

Further, the following expression (13) is obtained from a relationship of a difference in turning radius between the right and left wheels.

$$WBo/\sin(\alpha n - \Delta\alpha n) - WBi/\sin(\beta n + \Delta\beta n) = 2M \quad (13)$$

After $\Delta\alpha n$ and $\Delta\beta n$ have been calculated from the expressions (12) and (13), a turning radius can be calculated from the following expression.

$$Rmn = WBo/\sin(\alpha n - \Delta\alpha n)$$

Instead of balancing the cornering forces with each other in the normal directions as described above, various relational expressions can be set depending on the method of approximation and the method of setting a coordinate system. Owing to the relational expressions thus set, a turning radius can be calculated according to various methods. In any case, a turning radius is calculated on the basis of turning angles of the outer and inner steered vehicle wheels.

Although the turning radius Rm of the steered vehicle wheel on the outside of a turn is calculated in the embodiment, it is also possible, for example, to calculate the turning radius Rc or a turning radius of another wheel. However, since higher precision is guaranteed in approximation if the turning radius Rm is calculated, it is also possible to calculate the turning radius Rm and then convert it into the turning radius Rc or another turning radius.

The turning radius calculation method according to the aforementioned embodiment can be recorded in a computer-readable recording medium as a turning radius calculation program. The recording medium can transmit the contents described in the program to a reading unit of a computer by causing changes in a physical quantity such as magnetism, light, electricity, or the like. For instance, a magnetic disk, an optical disk, a CD-ROM, a semiconductor memory, or the like is used as the recording medium.

It is also possible to calculate a turning radius corresponding to an arbitrary steering angle according to the above-mentioned turning radius calculation method, and provide a driver with a locus to be followed by the vehicle during backward movement or a guidance on parking on the basis of the calculated turning radius.

Figure 6:
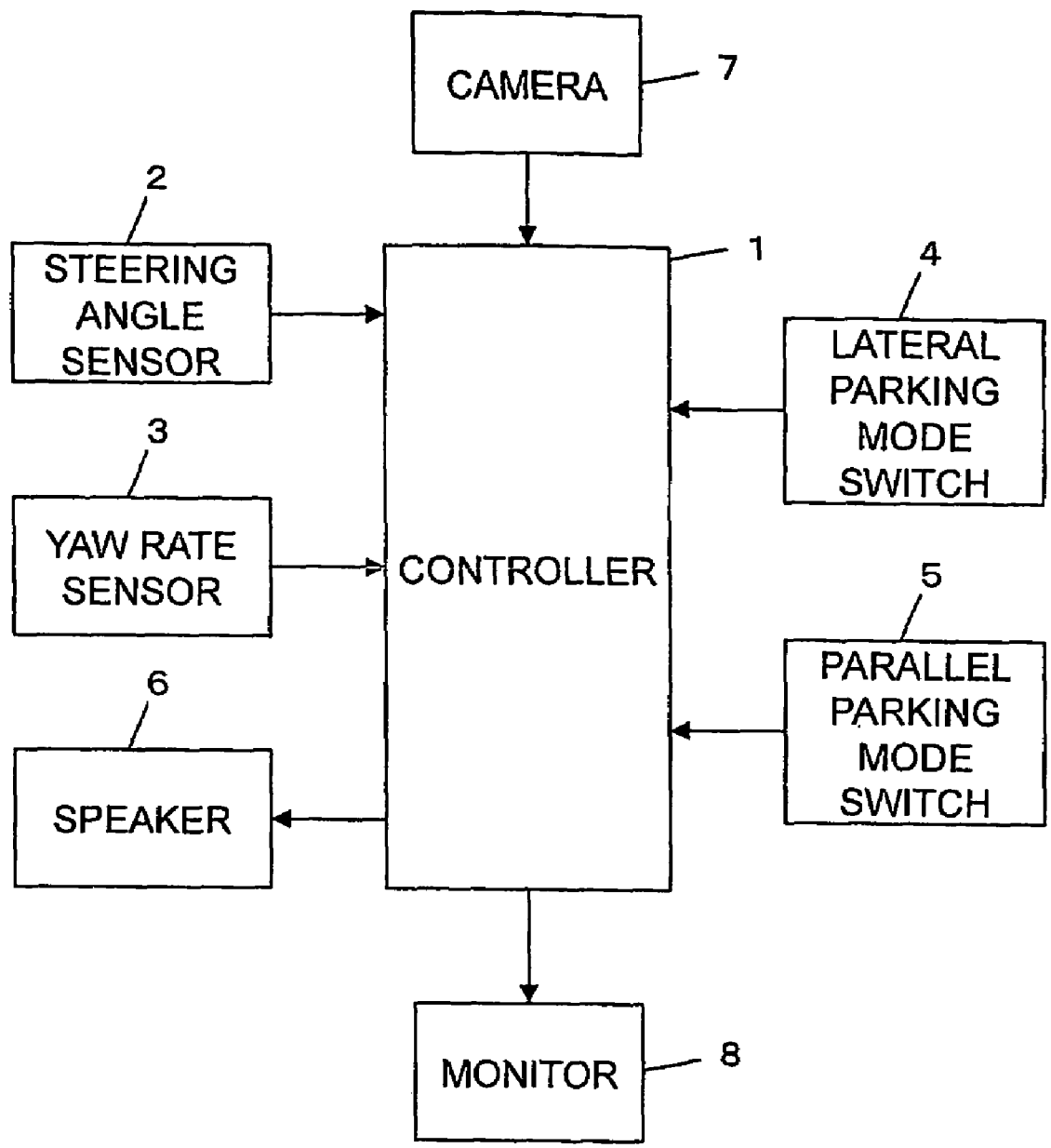
FIG. 6 is a block diagram showing the configuration of a parking assistance apparatus according to the embodiment.

FIG. 6 shows the configuration of a parking assistance apparatus to which the turning radius calculation method according to this invention is applied. A steering angle sensor 2 for detecting a steering angle of the steering wheel and a yaw rate sensor 3 for detecting an angular speed of the vehicle in the direction of yaw angle are connected to a controller 1. A lateral parking mode switch 4 for informing the controller 1 that the vehicle is to perform a lateral parking and a parallel parking mode switch 5 for informing the controller 1 that the vehicle is to perform a parallel parking are also connected to the controller 1. In addition, a speaker 6 for providing the driver with information on driving operation is connected to the controller 1.

Further, a camera 7 for capturing a rear view image of the vehicle and a monitor 8 for displaying the image transmitted from the camera 7 are connected to the controller 1.

The lateral parking mode switch 4, the parallel parking mode switch 5, and the monitor 8 are disposed in a driver seat. The camera 7 is attached to, for example, the roof of the vehicle.

The controller 1 is equipped with a CPU (not shown), a ROM in which a control program is stored, and a working RAM.

The aforementioned turning radius calculation program and a control program for providing parking assist in lateral parking and parallel parking are stored in the ROM. The CPU operates based on the control program stored in the ROM.

When a shift sensor (not shown) detects that a shift lever has been shifted to a reverse position, the controller 1 displays on the monitor 8 in a superimposed manner a vehicle rear view image captured by the camera 7 and a predicted backward movement locus 9 in the case where the vehicle is moved backward by a predetermined turning angle while maintaining a steering angle detected by the steering angle sensor 2. At this moment, a turning radius corresponding to an arbitrary steering angle is calculated according to the turning radius calculation program stored in the ROM, and the predicted backward movement locus 9 is prepared using the calculated turning radius.

Figure 7:
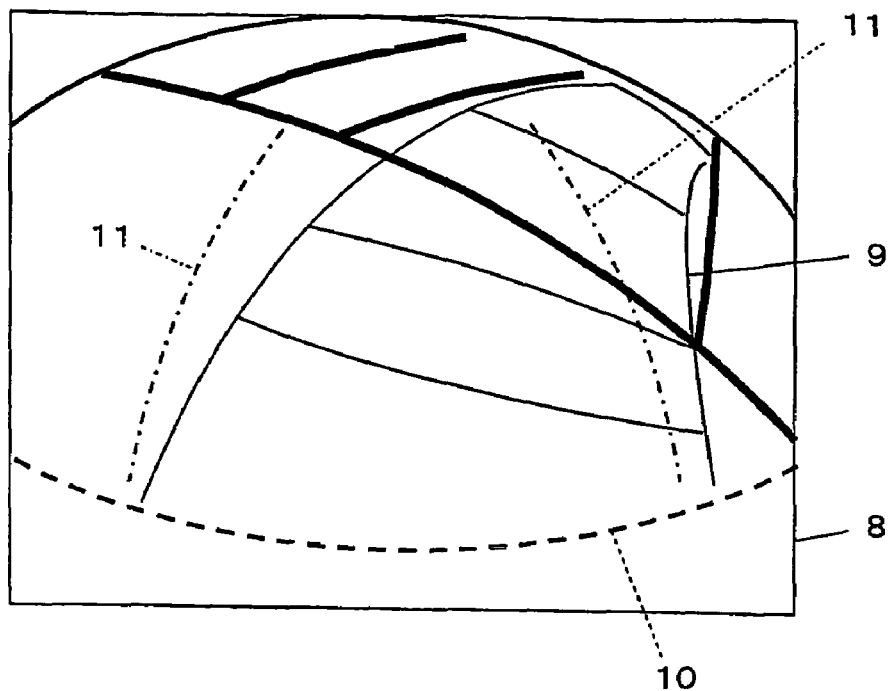
FIGS. 7 and 8 are views each showing a vehicle rear view image displayed on a monitor of the parking assistance apparatus.

FIG. 7 shows a rear bumper 10 of the driver's vehicle captured in the rear view image and a projected locus 11 followed by the vehicle in moving straight backward.

Further, the controller 1 calculates a yaw angle of the vehicle from a vehicle angular speed input from the yaw rate sensor 3, calculates a turning angle of the vehicle, and causes guidance information on operation methods and operation timings in respective steps during a parking operation to be displayed on the monitor 8 or to be output acoustically from the speaker 6. In accordance with these guidance information, the driver can easily and accurately perform the operation of parking the vehicle into a target parking space.

Figure 8:
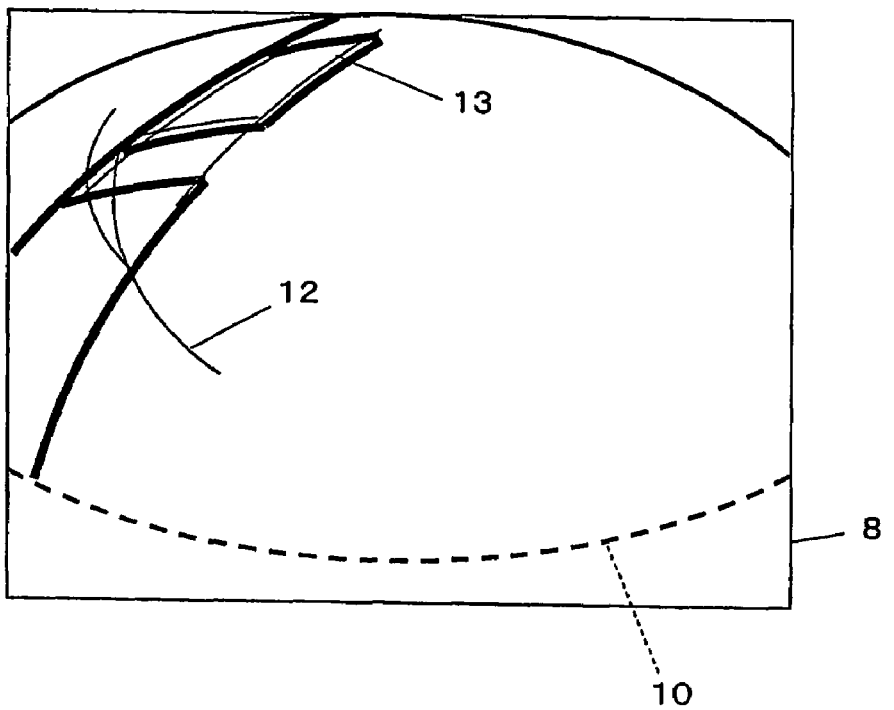

In a parallel parking as well, as shown in FIG. 8, a predicted backward movement locus 12 of the vehicle corresponding to a steering angle and a vehicle mark 13 indicating an intended parking position are displayed on the monitor 8. The driver is thus assisted in parking the vehicle.

In the parking assistance apparatus illustrated herein as an example, the display on a screen changes according to a steering amount, thus making it possible to determine whether or not the steering amount at that moment is appropriate. However, the parking assistance apparatus is not limited to this configuration. The parking assistance apparatus may also be designed to first set an appropriate locus or vehicle mark on the screen by means of a cursor or the like, assign a turning radius obtained therefrom to the above-mentioned expression (9) or (11), and acquire an appropriate steering amount.

In any case, the obtainment of a relational expression between an arbitrary steering angle and a turning radius corresponding thereto is indispensable in constructing the parking assistance apparatus.

The turning radius calculation method according to this invention is also applicable to a steering assistance apparatus that assists a driver in steering a vehicle backward by displaying on a monitor a predicted backward movement locus during backward movement of the vehicle without providing guidance information for parking and by allowing the driver to look at the predicted backward movement locus.

In the turning radius calculation method of this invention, as described above, the mere entry of data on predetermined known parameters based on design data makes it possible to calculate an approximate function of turning radius for steering angle without carrying out actual measurement. Thus, the application of this turning radius calculation method realizes a steering or parking assistance apparatus capable of being easily installed in several vehicle models despite the commonness in structure.

This invention makes it possible to easily obtain a vehicle turning radius corresponding to an arbitrary steering angle without carrying out actual measurement.

The invention claimed is:

1. A method for calculating a turning radius during an steering operation of a vehicle, the method comprising:
formulating relational expressions having variables based on a steering angle and turning angles of outer and inner tires of the vehicle and including known vehicle parameters and unknown steering parameters of the vehicle;
applying data to the known vehicle parameters based on design data of the vehicle;
applying values to the variables corresponding to a zero-steering state and a full-steering state of said vehicle to obtain conditional expressions, and calculating values corresponding to the unknown steering parameters based on said conditional expressions;
calculating turning angles of the outer and inner tires corresponding to a plurality of steering angles obtained by dividing a range between the zero-steering state and the full-steering state, respectively, by using the relational expressions to which the calculated values of the unknown steering parameters are applied;
calculating turning radii corresponding to the steering angles from the calculated turning angles of the outer and inner tires; and
calculating a function of an estimated turning radius for a predetermined steering angle based on the plurality of steering angles and the turning radii corresponding to the plurality of steering angles;
wherein a steering assistance apparatus outputs a signal containing a predicted steering path for said vehicle based on the calculated function.

2. The method according to claim 1, wherein a stroke of a rack moving in a lateral direction of the vehicle in accordance with steering of a steering wheel is included in the relational expressions as a variable corresponding to a steering angle.

3. The method according to claim 1, wherein the turning radii corresponding to the turning angles of the outer and inner tires are calculated by taking as a turning center a midpoint between an intersection point of an axis of a right front wheel and an axis of rear wheels and an intersection point of an axis of a left front wheel and the axis of the rear wheels.

4. The method according to claim 1, wherein the turning radii corresponding to the turning angles of the outer and inner tires are calculated by taking as a turning center a center of a turning circle which is set to balance slipping forces applied to right and left front wheels in a radial direction of the turning circle.

5. The method according to claim 1, wherein the approximate function of turning radius is a power function.

6. The method according to claim 1, wherein the approximate function of turning radius is a function for calculating the turning radius from a tire turning angle of a two-wheel model, the tire turning angle of the two-wheel model being expressed as a function of the steering angle with an order of two or more.

7. The method according to claim 1, wherein the signal containing the predicted steering path includes a backward movement locus of the vehicle.

8. The method according to claim 5, wherein the turning radius is a turning radius of a steered vehicle wheel on an outside of a turn.

9. A steering assistance apparatus for aiding steering of a vehicle, the apparatus comprising:
a controller unit configured to:
formulate relational expressions having variables based on a steering angle and turning angles of outer and inner tires of the vehicle and including known vehicle parameters and unknown steering parameters of the vehicle;
apply data to the known vehicle parameters based on design data of the vehicle;
apply values to the variables corresponding to a zero-steering state and a full-steering state of said vehicle to obtain conditional expressions, and calculate values corresponding to the unknown steering parameters based on said conditional expressions;
calculate turning angles of the outer and inner tires corresponding to a plurality of steering angles obtained by dividing a range between the zero-steering state and the full-steering state, respectively, by using the relational expressions to which the calculated values of the unknown steering parameters are applied;
calculate turning radii corresponding to the steering angles from the calculated turning angles of the outer and inner tires;
calculate a function of an estimated turning radius for a predetermined steering angle based on the plurality of steering angles and the turning radii corresponding to the plurality of steering angles; and
display on a monitor in a superimposed manner a vehicle rear view image during backward movement of the vehicle and a backward movement locus of the vehicle corresponding to the calculated function.

10. A parking assistance apparatus for providing guidance on an operation of parking a vehicle into a target parking space, the apparatus comprising:
a controller unit configured to:
formulate relational expressions having variables based on a steering angle and turning angles of outer and inner tires of the vehicle and including known vehicle parameters and unknown steering parameters of the vehicle;
apply data to the known vehicle parameters based on design data of the vehicle;
apply values to the variables corresponding to a zero-steering state and a full-steering state of said vehicle to obtain conditional expressions, and calculate values corresponding to the unknown steering parameters based on said conditional expressions;
calculate turning angles of the outer and inner tires corresponding to a plurality of steering angles obtained by dividing a range between the zero-steering state and the full-steering state, respectively, by using the relational expressions to which the calculated values of the unknown steering parameters are applied;
calculate turning radii corresponding to the steering angles from the calculated turning angles of the outer and inner tires; and
calculate a function of an estimated turning radius for a predicted steering angle based on the plurality of steering angles and the turning radii corresponding to the plurality of steering angles,
wherein guidance on the operation of parking the vehicle is provided in the form of a predicted steering path based on the calculated function.

11. A computer-readable recording medium storing thereon a turning radius calculation program for aiding steering of a vehicle, the program comprising relational expressions having variables based on a steering angle and turning angles of outer and inner tires of the vehicle and including known vehicle parameters and unknown steering parameters, the program causing a computer to execute the steps of:
reading data on the known vehicle parameters based on design data of the vehicle;

applying values of the variables corresponding to a zero-steering state and a full-steering state to obtain conditional expressions, calculating values corresponding to the unknown steering parameters based on said conditional expressions;

calculating a plurality of steering angles and turning angles of the outer and inner tires corresponding to the plurality of steering angles between the zero-steering state and the full-steering state, respectively, by using the relational expressions to which the calculated values of the unknown steering parameters are applied;

calculating turning radii corresponding to the steering angles from the calculated turning angles of the outer and inner tires;

calculating a function of an estimated turning radius for a predetermined steering angle based on the plurality of steering angles and the turning radii corresponding to the plurality of steering angles;

and generating an output signal in the form of a predicted steering path for said vehicle based on the calculated function.

12. The program according to claim 11, wherein a stroke of a rack moving in a lateral direction of the vehicle in accordance with steering of a steering wheel is included in the relational expressions as a variable corresponding to a steering angle.

13. The program according to claim 11, wherein the turning radii corresponding to the turning angles of the outer and inner tires are calculated by taking as a turning center a midpoint between an intersection point of an axis of a right front wheel and an axis of rear wheels and an intersection point of an axis of a left front wheel and the axis of the rear wheels.

14. The program according to claim 11, wherein the turning radii corresponding to the turning angles of the outer and inner tires are calculated by taking as a turning center a center of a turning circle which is set to balance slipping forces applied to right and left front wheels in a radial direction of the turning circle.

* * * * *